US009920746B2

(12) United States Patent
Diedrichs et al.

(10) Patent No.: US 9,920,746 B2
(45) Date of Patent: Mar. 20, 2018

(54) METHOD FOR CONTROLLING AN ELECTRIC GENERATOR

(71) Applicant: Wobben Properties GmbH, Aurich (DE)

(72) Inventors: Volker Diedrichs, Wardenburg (DE); Kai Busker, Grossefehn (DE); Alfred Beekmann, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 564 days.

(21) Appl. No.: 14/414,417

(22) PCT Filed: Jul. 3, 2013

(86) PCT No.: PCT/EP2013/064059
§ 371 (c)(1),
(2) Date: Jan. 12, 2015

(87) PCT Pub. No.: WO2014/009223
PCT Pub. Date: Jan. 16, 2014

(65) Prior Publication Data
US 2015/0198145 A1 Jul. 16, 2015

(30) Foreign Application Priority Data

Jul. 13, 2012 (DE) .......................... 10 2012 212 366

(51) Int. Cl.
*G05D 3/12* (2006.01)
*F03D 7/04* (2006.01)
(Continued)

(52) U.S. Cl.
CPC ........... *F03D 7/048* (2013.01); *F03D 7/0284* (2013.01); *F03D 7/04* (2013.01); *F03D 9/255* (2017.02);
(Continued)

(58) Field of Classification Search
CPC ................................. F03D 7/048; F03D 9/255
(Continued)

(56) References Cited

U.S. PATENT DOCUMENTS 6,891,281 B2 * 5/2005 Wobben ................ F03D 7/0224
290/44
6,965,174 B2 11/2005 Wobben
(Continued)

FOREIGN PATENT DOCUMENTS

CA      2 760 888 A1    6/2012
CN      200976561 Y    11/2007
(Continued)

OTHER PUBLICATIONS

Lu, Bin, et al. "A review of recent advances in wind turbine condition monitoring and fault diagnosis." Power Electronics and Machines in Wind Applications, 2009. PEMWA 2009. IEEE. IEEE, 2009.pp. 1-7.*
(Continued)

*Primary Examiner* — Satish Rampuria
(74) *Attorney, Agent, or Firm* — Seed IP Law Group LLP

(57) ABSTRACT

The invention relates to a method for controlling a generator of electric energy that is connected to an electrical supply grid on a grid connection point, comprising the following steps: feeding electrical power into the electrical supply grid, whereby the generator is operated in a first operating point, interrupting the feeding so that no power is fed into the supply grid if a fault in the electrical supply grid or a fault of the feeding into the electrical supply grid exists or is displayed, resuming the feeding so that electrical power is again fed into the supply grid, whereby the generator resumes the feeding in a second operating point or is gradually increased in said second operating point, and the second operating point is designed in such a way that it feeds
(Continued)

into the supply grid with a higher stability reserve than the first operating point.

18 Claims, 8 Drawing Sheets

(51) Int. Cl.
| | |
|---|---|
| H02J 3/16 | (2006.01) |
| H02J 3/38 | (2006.01) |
| F03D 7/02 | (2006.01) |
| H02J 3/24 | (2006.01) |
| G05B 15/02 | (2006.01) |
| H02J 3/00 | (2006.01) |
| H02P 9/10 | (2006.01) |
| F03D 9/25 | (2016.01) |

(52) U.S. Cl.
CPC ............. *F03D 9/257* (2017.02); *G05B 15/02* (2013.01); *H02J 3/00* (2013.01); *H02J 3/16* (2013.01); *H02J 3/24* (2013.01); *H02J 3/386* (2013.01); *H02P 9/105* (2013.01); *H02J 2003/001* (2013.01); *Y02E 10/723* (2013.01); *Y02E 10/763* (2013.01); *Y02E 40/34* (2013.01)

(58) Field of Classification Search
USPC .................................................. 700/275–306
See application file for complete search history.

(56) References Cited

U.S. PATENT DOCUMENTS

| | | | |
|---|---|---|---|
| 6,984,898 B2 | 1/2006 | Wobben | |
| 7,081,689 B2 | 7/2006 | Tilscher et al. | |
| 7,102,247 B2 | 9/2006 | Feddersen | |
| 7,126,236 B2 | 10/2006 | Harbourt et al. | |
| 7,227,276 B2 | 6/2007 | Caiozza | |
| 7,332,827 B2 | 2/2008 | Nielsen | |
| 7,462,946 B2 * | 12/2008 | Wobben ................ | F03D 7/0284 290/44 |
| 7,525,208 B2 | 4/2009 | Wobben | |
| 7,528,496 B2 | 5/2009 | Fortmann | |
| 7,787,266 B2 | 8/2010 | Janssen et al. | |
| 2003/0007369 A1 | 1/2003 | Gilbreth et al. | |
| 2006/0082936 A1 | 4/2006 | Ye et al. | |
| 2008/0303489 A1 * | 12/2008 | Park ..................... | H02M 5/4585 322/20 |
| 2010/0176770 A1 | 7/2010 | Fortmann | |
| 2011/0004357 A1 * | 1/2011 | Mathiowetz ............ | H02J 3/14 700/295 |
| 2011/0049903 A1 * | 3/2011 | Jorgensen ............ | F03D 7/0224 290/55 |
| 2012/0286509 A1 | 11/2012 | Rafoth | |

FOREIGN PATENT DOCUMENTS

| | | |
|---|---|---|
| CN | 101188397 A | 5/2008 |
| DE | 10105892 A1 | 9/2002 |
| DE | 10 2008 045 938 A1 | 3/2010 |
| DE | 10 2008 062 356 A1 | 7/2010 |
| DE | 10 2009 027 981 B4 | 4/2011 |
| JP | 5300658 A | 11/1993 |
| JP | 9312934 A | 12/1997 |
| JP | 11159437 A | 6/1999 |
| JP | 2002101559 A | 4/2002 |
| JP | 200388190 A | 3/2003 |
| JP | 2006514523 A | 4/2006 |
| JP | 2007506400 A | 3/2007 |
| JP | 201045969 A | 2/2010 |
| SU | 41498 U1 | 10/2004 |
| UA | 99572 C2 | 8/2012 |
| WO | 03065567 A1 | 8/2003 |
| WO | 2005027301 A1 | 3/2005 |
| WO | 2011/050807 A2 | 5/2011 |
| WO | 2011110193 A1 | 9/2011 |
| WO | 2012/089699 A2 | 7/2012 |

OTHER PUBLICATIONS

Brière, Dominique, and Pascal Traverse. "AIRBUS A320/A330/A340 electrical flight controls-a family of fault-tolerant systems." Fault-Tolerant Computing, 1993. FTCS-23. Digest of Papers., The Twenty-Third International Symposium on. IEEE, 1993. pp. 616-623.*
Hsueh, Mei-Chen, Timothy K. Tsai, and Ravishankar K. Iyer. "Fault injection techniques and tools." Computer 30.4 (1997): pp. 75-82.*
Cárdenas et al., "Control Strategy for Power Smoothing Using Vector Controlled Induction Machine and Flywheel," *Electronics Letters* 36(8): 765-766, Apr. 13, 2000.
Thiringer et al., "Grid Disturbance Response of Wind Turbines Equipped with Induction Generator and Doubly-Fed Induction Generator," *Proceedings of 2003 IEEE Power Engineering Society General Meeting*, Toronto, Ontario, Canada, Jul. 13-17, 2003, pp. 1542-1547.
Akhmatov, "Variable-speed Wind Turbines with Doubly-fed Induction Generators, Part II: Power System Stability," *Wind Engineering*, vol. 26, No. 3, 2002, pp. 171-188.
Dokopoulos et al., "Improvement of Power Quality Distortion in a Grid Caused by Wind Turbines," 8*th* *International Conference on Harmonics and Quality of Power*, Athens, Greece, Oct. 14-16, 1998, pp. 917-922.
Koch et al., "Dynamic Interaction of Large Offshore Wind Farms with the Electric Power System," *IEEE Bologna PowerTech Conference*, Bologna, Italy, Jun. 23-26, 2003, pp. 1-7.
Diedrichs et al., "Loss of (Angle) Stability of Wind Power Plants—The Underestimated Phenomenon in Case of Very Low Short Circuit Ratio," 10th International Workshop on Large-Scale Integration of Wind Power into Power Systems, Transmission Networks for Offshore Wind Farms, Aarhus Denmark, Oct. 25-26, 2011, 8 pages.
Miller et al., "Advanced Controls Enable Wind Plants to Provide Ancillary Services," 2010 IEEE Power and Energy Society General Meeting, Minneapolis, Minnesota, USA, Jul. 25-29, 2010, 6 pages.
Chaudhary et al., "Wind Farm Grid Integration Using VSC Based HVDC Transmission—An Overview," *IEEE Energy* 2030, Atlanta, Georgia, USA, Nov. 17-18, 2008, 7 pages.
Hansen et al., "Centralised power control of wind farm with doubly fed induction generators," *Renewable Energy* 31(7):935-951, 2006.

* cited by examiner

METHOD FOR CONTROLLING AN ELECTRIC GENERATOR

BACKGROUND

1. Technical Field

The present invention relates to a method for controlling a generator of electric energy that is connected to an electrical supply grid on a grid connection point. Furthermore, the present invention relates to a generator of electric energy that is connected to an electrical supply grid.

2. Description of the Related Art

Feeding electric energy into an electrical supply grid, such as the European grid or the US power grid, is generally known. The electrical supply grid as described below refers to the widely accepted AC voltage grid. This does not exclude the presence of DC voltage sections in the grid. Likewise, frequency-independent aspects may generally also refer to a DC voltage grid. Historically, energy is fed into an electrical supply grid with a large power station that drives a synchronous generator using primary energy, such as coal, nuclear energy or gas. Depending on the number of pole pairs and the speed of the synchronous generator, this generator feeds into the supply grid with a certain frequency. The synchronous generator may be technically controlled so as, for example, to adjust the output. However, this adjustment process can take a long time.

With changing situations in the supply grid, the physical reaction of the synchronous generator often causes a change in the grid condition, at least for a short time. For example, the speed of the synchronous generator increases if the supply grid is not able to take the power completely that is or can be provided by the synchronous generator. This excess power then accelerates the synchronous generator, which results in an increased feeding frequency. Accordingly, the frequency in the supply grid may increase.

When feeding into a supply grid, the network stability typically must also be taken into account. The loss of network stability, i.e., the loss of the stability of the supply grid, may result in the feeding generator being powered off. Such a loss of stability, which is referred to as such and abbreviated as "LOS" among German-speaking experts, describes physical processes that no longer allow for a continued operation and must be terminated by cutoffs. In the case of power plants, this affects their output, and can thus contribute to an escalation of the so-called deficit output. In the worst case, this loss of stability leads to a total energy system failure due to error cascading and deficit accumulation. Such total failures are very rare; however, one occurred in Italy on 24 Sep. 2004.

Loss of network stability, i.e., the so-called loss of stability, is a phenomenon which involves a loss of angular stability that may eventually cause a loss of voltage stability.

Overcurrents to be achieved are determined as stability criteria, which must be provided in the case of a loss of stability. This requires the system to have a certain design. A new power plant, in particular a power plant that is to be newly built, is thus coordinated to the supply grid as is represented on the grid connection point to which the power plant is to be connected.

When connecting large power plants to an electrical supply grid, the short circuit current ratio is an important criterion; this is known among German specialists as "short circuit radio" and abbreviated as "Scr". This short circuit current ratio is the ratio of the short circuit power to the connected load. Short circuit power is the power that the respective supply grid on the considered grid connection point, to which the power plant is to be connected, can provide in the case of a short circuit. The connected load is the connected load of the power plant that is to be connected, in particular the nominal capacity of the generator that is to be connected.

To secure reliable operation, i.e., to avoid a loss of stability to the greatest extent possible, power plants are generally designed for the respective grid connection point in such a way that the short circuit current ratio is higher than 10, normally even higher than 15. The supply grid can then provide a relatively high short circuit power on the grid connection point. That means that the grid has a low impedance and is referred to as a strong grid.

In the case of a weak grid (in other words, in the presence of a high impedance), feeding is only possible with a low connected load, i.e., only a power plant with a low connected load can be connected. This usually leads to the fact that either a new power plant is not connected to such a grid connection point, or the grid has to be changed, particularly by equipping it with further, more powerful lines. This is generally referred to as grid reinforcement.

For feeding electric energy by decentralized production units, in particular wind power installations, the problem of the grid's loss of stability is basically unknown. Already at the end of the nineties, first proposals were made to ensure that wind power installations also contribute to the electrical support of the grid. This, however, does not take into account the cause of a loss of stability, in particular that feeding into the supply grid can cause a loss of stability.

For example, the German patent application U.S. Pat. No. 6,891,281 describes a method in which wind power installations can change and, in particular, reduce their power feed-in. U.S. Pat. No. 7,462,946 suggests that in the case of a grid failure, particular in the case of a short circuit, a wind power installation limits the power that it feeds-in instead of being disconnected from the grid in order to achieve a grid support. U.S. Pat. No. 6,965,174 describes a method for supporting the grid by means of a wind power installation that, depending on the grid voltage, adjusts a phase angle of the fed-in electricity, and thus feeds reactive power into the grid depending on the voltage so as to support the grid. U.S. Pat. No. 6,984,898 also relates to a method for supporting the grid by means of a wind power installation in which the wind power installation reduces, depending on the grid voltage, the power that is to be fed into the grid, particularly so as to avoid a disconnection from the grid in order to support the grid by means of a wind power installation.

The fact that such decentralized production units, such as wind power installations, may be the underlying cause for the loss of stability in the grid has not been taken into account. In the essay "Loss of (Angle) Stability of Wind Power Installations" by V. Diedrichs et al., submitted for and presented at the "10th International Workshop on Large-Scale Integration of Wind Power into Power Systems as well as on Transmission Networks for Offshore Wind Farms, Aarhus (Denmark), 25-26 Oct. 2011". There, reference was basically made to the problem that the loss of stability in the grid can basically also occur for wind power installations that are connected to the supply grid for feed-in. This essay essentially raises awareness of the problem and is hereby incorporated herein by reference in its entirety. In particular, its technical explanations also apply to the present application.

Basically, findings, experience and other knowledge of the operation and connection of large power plants to the electrical supply grid cannot be transferred to wind power installations, including large wind parks with numerous wind power installations that are connected to the supply grid for feed-in. The responsible expert who connects a power plant to a supply grid in order to operate it there is already a different expert from the one wanting to connect a wind power installation to the supply grid in order to operate it there. Wind power installations—and much of the following also applies to decentralized production units—depend on wind and therefore take a fluctuating energy source into account; they usually do not feed into the supply grid with a synchronous generator that is directly coupled to the grid, but use a voltage-based inverter instead; they have a different size than large power plants, whereby their nominal capacity is usually 3 powers of ten below that of a large power plant; they are usually subject to other political laws which often ensure the acceptance of the provision of service by the operators of electrical supply grids; they are usually decentralized; and, they usually feed into a medium-voltage grid, whereas large power plants usually feed into an extra high voltage grid.

If a loss of stability that is to be avoided occurs in spite of all due caution and precautionary measures, this leads to a problematic situation. If such a loss of stability occurs, the generator of electric energy must be switched off for the concerned grid connection point. Such a switching off is triggered according to predetermined criteria, and the respectively concerned generator monitors said criteria, and switches off if it has recognized that said criteria are met. However, the power that is immediately fed into the grid, and thus the existing power in the grid, changes. The loss of said power of said generator can lead to the fact that further points of common coupling nearby meet the criteria for switching off, and accordingly switch off further generators, which can result in even further generators being switched off, which can finally result in a complete blackout of the entire supply grid.

The German Patent and Trademark Office has found the following prior art in the priority application for the present application: DE 10 2009 027 981 B4, DE 10 2008 062 356 A1, WO 2011/050807 A2 and DE 10 2008 045 938 A1.

BRIEF SUMMARY

One or more embodiments of the present invention may address at least one of the problems mentioned above and in the case of the above described loss of stability in the supply grid, or at least a threatening loss of stability, minimizes the threatening damage. An alternative solution should at least be proposed.

According to one embodiment of the invention, a method for controlling a generator of electric energy that is connected to an electrical supply grid on a grid connection point is proposed. According to this embodiment, electrical power is fed into the electrical supply, whereby the generator is operated at a first operating point. Such an operating point can, for example, be determined by the fed-in active power and, if the case may be, by the fed-in reactive power. Feeding active power in the amount of the nominal capacity of the generator and feeding reactive power in the amount of 10% of the fed-in active power serve as an example for an operating point here, to name only one example.

Whereas the generator is operated at said first operating point, the feeding is then interrupted so that no power is fed into the supply grid if a fault in the electrical supply grid or a fault of the feeding into the electrical supply grid exists or is displayed. Therefore, such a fault is monitored, and if it is detected, an interruption of the feeding is triggered. Said interruption is not performed with all minimal faults, but only with faults that are to trigger said interruption. For this purpose, respective criteria can be determined, such as a voltage drop above a threshold value, or a gradient of a voltage drop above a threshold value on the grid connection point, to name only two examples that can also be combined.

The next step is to resume the feed or feeding so that electrical power is again fed into the supply grid. Said resumption of the feeding should be performed as quickly as possible. It requires that said feeding be permissible. In particular, cases might occur in which the fault has either been resolved, or in which the criterion of the fault can only be derived from the type of the generator's feeding. For example, the generator's operating point can suddenly and undesirably shift to an area that results in this specific generator becoming instable during the feeding into the respective grid connection point. Therefore, the mere fact that the respective generator no longer feeds into the grid can resolve the loss of stability associated with the current feeding of said generator, so that the generator could, at least theoretically, resume the feeding directly afterwards.

It is now proposed that the generator, when resuming the feeding, provide it at a second operating point, or that it be gradually increased to the second operating point, particularly if a sudden start at the second operating point is non-physical. Accordingly, the gradual increase to said second operating point can also be performed very quickly.

Said second operating point is designed in such a way that power is fed into the supply grid with a higher stability reserve than with the first operating point. The first operating point, in which operation took place prior to the fault, and which can preferably be the usual operating point of said generator, is also stable, i.e., has a usually sufficient stability reserve. However, it is now proposed to select a second operating point which has a higher stability reserve than the first operating point.

Often, such a higher stability reserve can result in the fact that the generator feeds less efficiently, particularly feeds less power. However, this is accepted to allow the generator to resume feeding as soon as possible, and thus to reverse as quickly as possible, or at least reverse in part, the loss of feed power of said generator when the feeding is interrupted. Thus, power is again provided as quickly as possible so as to particularly prevent a shut off cascade, which in the worst case results in a blackout.

Preferably, the generator is a decentralized generator, a wind power installation or a wind park comprising several wind power installations.

A decentralized generator is a generator that, with regard to the grid into which it feeds, is arranged or connected in a decentralized manner. Therefore, the grid is not aligned to it, and it is rather decentralized with regard to the capacity focal points of the electrical supply grid. In addition, a decentralized generator usually has a comparatively low power, usually only 10 MW or less. A wind power installation typically is a decentralized generator.

A wind park comprising several wind power installations has a higher connected load than the individual wind power installations it comprises. However, it can be provided as a decentralized generator, particularly if it has a size that is at least clearly less than that of a large power plant. With regard to controllability, a wind power installation and/or a wind park can often be controlled at least more quickly than a large power plant. With a modern wind power installation or a wind park with modern wind power installations in particular, the feeding into an electrical supply grid can be changed much more quickly and more flexibly than what is usual with a large power plant, provided that there is sufficient wind.

Preferably, a voltage-based feeding is used. Therefore, the generator is basically designed as a controlled voltage source, and is accordingly flexible when feeding into the supply grid. Modern wind power installations are also often designed as such voltage-based generators. In any case, a generator or a feeding can be said to be voltage-based if the generator, particularly the wind power installation, has a voltage-based inverter for feeding.

According to one embodiment, it is proposed that the generator at the second operating point feed less active power and/or reactive power into the supply grid than at the first operating point. Preferably, a value that is reduced by at least 10%, particularly by at least 20% is proposed here, as opposed to the value of the first operating point. For the reactive power of the second operating point, a reduction by at least 10%, particularly by at least 20% is proposed, as opposed to the reactive power value of the first operating point. In the second operating point, less active power or less reactive power can be fed to achieve a more stable operating point, or to achieve an operating point that is further away from the stability boundary. Here, "further away" means a higher active or reactive power difference value. It has become evident that reducing the active power is often useful, and that the reactive power is not required to be reduced, or that the reactive power is only required to be reduced by a lower value with regard to the first operating point. Therefore, it is proposed that the wind power installation at first be operated particularly with reduced active power after the interruption of the feeding, until the conditions, particularly the conditions in the electrical supply grid, have normalized and/or stabilized.

Preferably, the method is characterized in that the feeding is resumed in such a way that the fed-in reactive power is changed, and particularly increased more quickly than the fed-in active power, so that the reactive power value of the second operating point is achieved earlier than the active power value of the second operating point and/or so that the reactive power value of the first operating point is achieved earlier than the active power value of the first operating point. It has been recognized that the stability of the feeding and/or of the grid can be increased during the restart if, at first, more reactive power than active power, or even only reactive power, is fed in. Here, the final value which can be different between the reactive power and the active power is taken as a basis.

It is therefore proposed to achieve an operating point that is as stable as possible by selecting an appropriate reactive power share when the feeding is resumed. For example, feeding in reactive power can increase the grid voltage on the connection point, which can have a stabilizing effect. Here, it can be advantageous to first feed in or take only reactive power.

If the reactive power, with regard to the first operating point, is adjusted more quickly than the active power, this means that a second operating point, for example, is reached, as the case may be only for a short period, if the reactive power has reached the value of the first operating point. In this case, the active power of the second operating point would be reduced as compared with the active power of the first operating point.

Another favorable method is characterized in that at first, the reactive power is adjusted, particularly to the value of the first or second operating point, so as to support the grid, and then the active power is adjusted, particularly increased, and/or that the reactive power and the active power are adjusted respectively with a ramp function in terms of time, and the ramp function is selected in such a way that the reactive power value of the second operating point is achieved earlier than the active power value of the second operating point and/or that the reactive power value of the first operating point is achieved earlier than the active power value of the first operating point.

It is thus proposed to specifically adjust the reactive power first so as to achieve stabilization. Here, the second operating point can be characterized by a high reactive power component, but a small active power component. In particular, the active power component can be zero.

Alternatively or in combination, the reactive power is changed with a steeper ramp function than during the gradual increase of the active power. The steepness of the respective ramp functions relates to the respective final value of the reactive power or the active power, particularly to the values of the first or second operating point.

A method according to another embodiment is characterized in that when the feeding is resumed, the fed-in active power is increased with a predetermined course, particularly in ramp form, and that the fed-in reactive power is at the same time conducted in such a way that it stabilizes the voltage, whereby the reactive power is particularly conducted on the basis of a previously recorded grid characteristic of the electrical supply grid. Therefore, the active power is particularly gradually increased along a ramp so as to feed power into the electrical supply grid as soon as possible, but with sufficient time so as to maintain stability. Here, the reactive power has a stabilizing effect during the gradual increase of the active power. The reactive power can be changed far more dynamically, to achieve stabilization.

The stabilization particularly relates to the voltage on the grid connection point, which is to be kept as constant as possible and/or within a predetermined tolerance area. Preferably, the proposed solution is to take the previously recorded grid characteristics of the connected supply grid as a basis. The supply grid's behavior on the grid connection point can be known this way, or at least in part, and the supply grid's response on the grid connection point, particularly the response of the voltage on the grid connection point to the planned gradual increase of the active power, is foreseeable. As a result, the reactive power can be specifically conducted knowing that the feeding in of the active power is planned to be gradually increased. For example, the reactive power can be controlled on the basis of the planned feeding in of the active power and the pre-known grid characteristic. A feedback control can be complemented, In particular, the reactive power can also be conducted in such a way that a stability boundary is met during the gradual increase. According to the selected stability boundary, a second operating point is also controlled here with a higher stability distance than the first operating point.

If the wind power installation is at first operated with reduced power during restart, it can contribute to the feeding of power into the supply grid, and thus help to support the grid, but is at the same time in a comparatively stable operating point.

Preferably, the feeding is resumed within a predetermined resumption time after the interruption, whereby preferably a resumption time of less than 10 seconds is chosen. Preferably, a gradual increase in the second operating point takes place when the feeding is resumed within a predetermined run-up time. In order to achieve grid support, the plant should resume the feeding into the grid as quickly as possible, whereby the selection of the second operating point can ensure that, in spite of said quick resumption of the feeding, the feeding is stable and the plant does not immediately return to an unstable feeding condition that previously already led to an interruption of the feeding. Therefore, it is proposed to quickly restart and support the grid while maintaining stability.

According to one embodiment, it is proposed that a stability reserve be the smallest difference between the fed-in reactive power and the reactive power of a stability boundary. The fed-in reactive power is a specific value, while a stability boundary is at least a gradient. Therefore, different differences result from the value of the fed-in reactive power to the stability boundary, i.e., the gradient of said boundary. According to this proposal, the smallest of said differences is the stability reserve. In other words, the stability reserve is, vividly described, the smallest distance to the stability boundary.

According to another embodiment, it is proposed that the stability reserve be the smallest difference between the fed-in active power and the active power of the stability boundary.

According to another embodiment, it is proposed that the stability reserve be the smallest difference between the voltage on the grid connection point and the voltage of the stability boundary.

Preferably, the stability reserve can also be composed of said differences. Preferably, a connection between the active power that is to be fed in and the reactive power that is to be fed in is taken as a basis for the stability boundary, such as a course of the active power according to the reactive power. The smallest distance to a stability boundary that is defined as such can be used as a stability reserve of an operating point, which is defined by its active power share and its reactive power share. In mathematical terms, this can be calculated by the method of least squares. The smallest distance to the stability boundary is given for the point on the stability boundary at which the root of the sum of the square of the reactive power difference and the square of the active power difference is the smallest.

Preferably, the stability boundary can be a function of the grid voltage on the grid connection point depending on the fed-in reactive power, or depending on the fed-in active power, or depending on both, whereby the function can or will cover, vividly described, a surface, particularly a curved surface. Said curved surface would be the grid voltage on the grid connection point depending on the fed-in reactive power and the fed-in active power. A surface would thus result in a space which is spanned by the grid voltage on the grid connection point, the fed-in reactive power and the fed-in active power, particularly in the sense of a Cartesian space.

According to another embodiment, it is proposed that the feeding be interrupted when a loss of stability of the supply grid and/or of the feeding into the supply grid occurs on the grid connection point or if it is displayed. Insofar, the case which is to be avoided if possible, i.e., a loss of stability, would already occur. From the perspective of the feedback control, a signal is preferably evaluated which signalizes that said loss of stability of the supply grid or of the feeding occurs.

An interruption can also or alternatively be triggered by an overcurrent in the supply grid and/or on the grid connection point. In addition or alternatively, a fault can occur in the supply grid, particularly a short circuit, which was identified, and thus leads to an interruption of the feeding.

In addition or alternatively, a voltage fall in the supply grid and/or on the grid connection point can also result in an interruption. In particular, a voltage fall below a predetermined value is a clear indicator of a serious problem in the grid. Basically, a voltage excess can also indicate a problem in the grid, and require an interruption. In the case of an undesired voltage excess, it will often be useful to stop the generator at first from feeding additional power into the grid again. Feeding negative reactive power might counteract the grid voltage.

Also or alternatively, the switching in the grid and/or the incremental grading of transformers in the supply grid can result in interruptions, particularly if said switchings or gradings of transformers, i.e., particularly the operating of so-called tapped transformers, goes beyond the usual level.

The occurrence of extreme gusts can also result in an interrupted feeding.

According to one embodiment, it is proposed, when a threatening loss of stability is identified on the grid connection point, and/or when the feeding is resumed, to switch from a normal control to a stabilization control, which controls the generator with higher stability compared to the normal control. This is to prevent a threatening loss of stability, or that resuming the feeding again results in a problem, particularly a loss of stability, and particularly an interruption of the feeding.

Preferably, with regard to the described threatening loss of stability, or when the feeding is resumed, it is proposed that the active power of the generator that is to be fed in be reduced to a value that is smaller than the maximum value of the generator, particularly to a value that is smaller than a nominal capacity of the generator. Said reduction of the active power to the value smaller than the maximum value particularly results in a stability reserve on the one hand, and a reserve of the feedback control for the generator on the other hand, particularly for a wind power installation, if it is said generator.

According to another embodiment, it is proposed, in the case of a threatening loss of stability, or when the feeding is resumed, and the generator is a wind park with several wind power installations, to switch from a normal control to a central park control. In said problematic case, the control is no longer left to each individual wind power installation, but a central coordination of the wind power installations is proposed instead, particularly with regard to the feeding, so as to counteract a loss of stability.

Preferably, the switching to the stabilization control, the limitation of the active power and/or the use of the central park control is maintained until it is identified that a loss of stability is no longer threatening. Here, the focus is to control the wind power installation, the wind park or another generator primarily with regard to stability, and at the same time to accept a reduced feeding in of active power. In other words, the focus is on stabilization, and it is even accepted that if a wind power installation or a wind park is used, energy contained in the wind is wasted.

Switching to a stabilization control corresponds to the switching from the first operating point to the second operating point. An operation in the second operating point can also be referred to as stabilization control.

According to a preferred embodiment, it is proposed to reset the control of the generator to a (or the) normal control by an external signal of a (or the) stabilization control, and/or to annul the limitation of the fed-in active power, after a threatening loss of stability has been identified on the grid connection point and/or the feeding has been resumed. It is therefore proposed that the resetting to basically a normal condition, which is not based on increased stabilization, depend on an external signal. For example, an evaluation device can generate said external signal, or the operator of the electrical supply grid can provide said signal. By evaluating said external signal, resetting to normal operation can be performed more reliably and can particularly be produced more effectively. This minimizes the risk that resetting to the normal operation is performed too early, i.e., before the previously detected or threatening stability problem has actually been resolved.

According to one embodiment, it is proposed that a wind park with several wind power installations be provided, whereby each wind power installation is a generator. After the feeding of one or several wind power installations has been interrupted, it or they resume the feeding individually. In particular, each wind power installation respectively switches from a normal control to a stabilization control, which controls the respective wind power installation with higher stability in comparison to the normal control. In particular, this relates to the case in which the feeding is not interrupted in the entire wind park, but only in a few wind power installations. There can be several reasons for this, for example, that one or several wind power installations have interrupted the feeding due to an extreme gust. Also, measuring inaccuracies can lead to the fact that some wind power installations start from a case that requires an interruption, whereas others are not yet required to interrupt. Also, a remote placement can lead to slightly different conditions between the wind power installations in the park that are sufficient for the plants to respond differently. Furthermore, there can be different types of plants, which take different criteria as a basis for an interruption of the feeding.

For this case, it is proposed that the wind power installations that have interrupted their feeding be switched on again as soon as possible, and in a stable condition so as to counteract a cascade effect. Therefore, it is to be prevented that wind power installations, which have not yet detected the criterion for an interruption, not be required to interrupt their feeding because of the interruption of other wind power installations. It is therefore proposed to allow the wind power installations, which have interrupted the feeding, to resume the feeding as quickly as possible, but in an operating point that is as stable as possible.

Preferably, one or several wind power installations, which have interrupted the feeding, are to resume the feeding even before the underlying fault is resolved, at least before the underlying fault is completely resolved. Basically, if the feeding is interrupted because of a fault, the feeding can only be resumed if said fault no longer exists. However, due to the proposed feeding with a changed operating point, it is possible, as the case may be, to resume the feeding in spite of a still existing interruption. This particularly concerns the case in which the interruption was performed so quickly that switching to a more stable operating point in order to prevent the interruption was not yet possible.

The load flow calculation described below is used to analyze stationary operating conditions of energy supply systems. The underlying basis is the representation shown in FIG. 9 of the respective grid through its impedances Z or its admittances Y (complex conductances).

The classical grid analysis determines the grid via Ohm's law with the following linear equation system in matrix notation, which describes a correlation for n-knots.

$$\begin{bmatrix} Y_{11} & \cdots & Y_{12} & Y_{1i} & \cdots & Y_{1n} \\ Y_{21} & \cdots & Y_{22} & Y_{2i} & \cdots & Y_{2n} \\ \vdots & & \vdots & \vdots & & \vdots \\ \vdots & & \vdots & \vdots & & \vdots \\ \vdots & & \vdots & \vdots & & \vdots \\ Y_{n1} & \cdots & Y_{n2} & Y_{ni} & \cdots & Y_{nn} \end{bmatrix} \begin{bmatrix} U_1 \\ U_2 \\ \vdots \\ \vdots \\ \vdots \\ U_n \end{bmatrix} = \begin{bmatrix} I_1 \\ I_2 \\ \vdots \\ \vdots \\ \vdots \\ I_n \end{bmatrix}$$

i.e.: $\underline{Y} \cdot \underline{U} = \underline{I}$ (linear equation system).

The aim is to determine voltages on each of the n-grid knots (→voltage maintenance).

As the currents in the grids are unknown but the (planned) feed-ins and electrical falls are known, the currents are expressed as outputs.

$$I_{ii} = \frac{\underline{S}_i^*}{\underline{U}_i^*} = \frac{P_i - jQ_i}{\underline{U}_i^*}$$

Representing the grid equations via outputs results in the formation of a non-linear equation system.

$$\underline{S}_i^* = P_i - jQ_i = Y_{i1} \underline{U}_1 \underline{U}_i^* + Y_{i2} \underline{U}_2 \underline{U}_i^* \ldots -= U_i^* \sum_{k=1}^{n} Y_{ik} \underline{U}_k$$

This non-linear equation system is solved numerically (usually by Newton's method). When solving the equation system numerically, it must be linearized. This is done by the partial discharges of the matrix elements on the basis of the unknown, namely still the amplitude ($U_2 \ldots U_n$ and the angle ($\delta_2 \ldots \delta_n$) of the knot voltages here.

The matrix with the partial discharges is called a Jacobian matrix. In order to solve the equation system, this must be invertible, i.e., regular.

Jacobian Matrix $$\begin{bmatrix} \Delta P_2^{(0)} \\ \vdots \\ \Delta P_n^{(0)} \\ \vdots \\ \Delta Q_2^{(0)} \\ \vdots \\ \Delta Q_n^{(0)} \end{bmatrix} = \begin{bmatrix} \left(\frac{\partial P_2}{\partial \delta_2}\right)^{(0)} & \cdots & \left(\frac{\partial P_2}{\partial \delta_n}\right)^{(0)} & \left(\frac{\partial P_2}{\partial U_2}\right)^{(0)} & \cdots & \left(\frac{\partial P_2}{\partial U_n}\right)^{(0)} \\ \vdots & & \vdots & \vdots & & \vdots \\ \left(\frac{\partial P_n}{\partial \delta_2}\right)^{(0)} & \cdots & \left(\frac{\partial P_n}{\partial \delta_n}\right)^{(0)} & \left(\frac{\partial P_n}{\partial U_2}\right)^{(0)} & \cdots & \left(\frac{\partial P_n}{\partial U_n}\right)^{(0)} \\ \vdots & & \vdots & \vdots & & \vdots \\ \left(\frac{\partial Q_2}{\partial \delta_2}\right)^{(0)} & \cdots & \left(\frac{\partial Q_2}{\partial \delta_n}\right)^{(0)} & \left(\frac{\partial Q_2}{\partial U_2}\right)^{(0)} & \cdots & \left(\frac{\partial Q_2}{\partial U_n}\right)^{(0)} \\ \vdots & & \vdots & \vdots & & \vdots \\ \left(\frac{\partial Q_n}{\partial \delta_2}\right)^{(0)} & \cdots & \left(\frac{\partial Q_n}{\partial \delta_n}\right)^{(0)} & \left(\frac{\partial Q_n}{\partial U_2}\right)^{(0)} & \cdots & \left(\frac{\partial Q_n}{\partial U_n}\right)^{(0)} \end{bmatrix} \begin{bmatrix} \Delta \delta_2^{(0)} \\ \vdots \\ \Delta \delta_n^{(0)} \\ \vdots \\ \Delta U_2^{(0)} \\ \vdots \\ \Delta U_n^{(0)} \end{bmatrix}$$

BRIEF DESCRIPTION OF THE SEVERAL VIEWS OF THE DRAWINGS

The invention is described in more detail below by embodiments as examples with reference to the accompanying figures.

DETAILED DESCRIPTION

Below, identical reference signs for similar, but non-identical elements may be provided, or they can also be provided for elements that are only illustrated schematically or symbolically, and which may have different details, but which are not relevant for the respective explanation.

Figure 1:
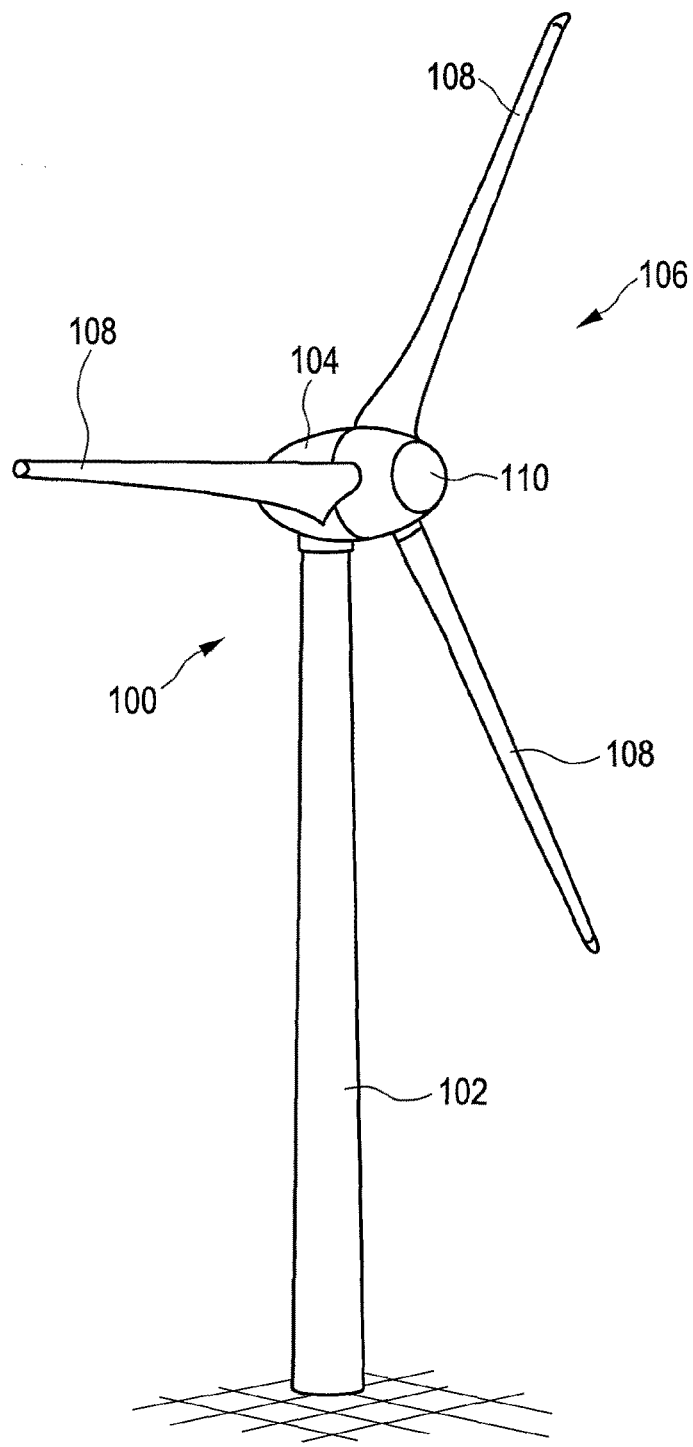
FIG. 1 shows a wind power installation in a perspective view.

FIG. 1 shows wind power installation 100 with tower 102 and nacelle 104. Rotor 106 with three rotor blades 108 and spinner 110 is located on nacelle 104. Rotor 106 is set in operation by the wind in a rotating movement, thereby driving a generator in nacelle 104.

Figure 2:
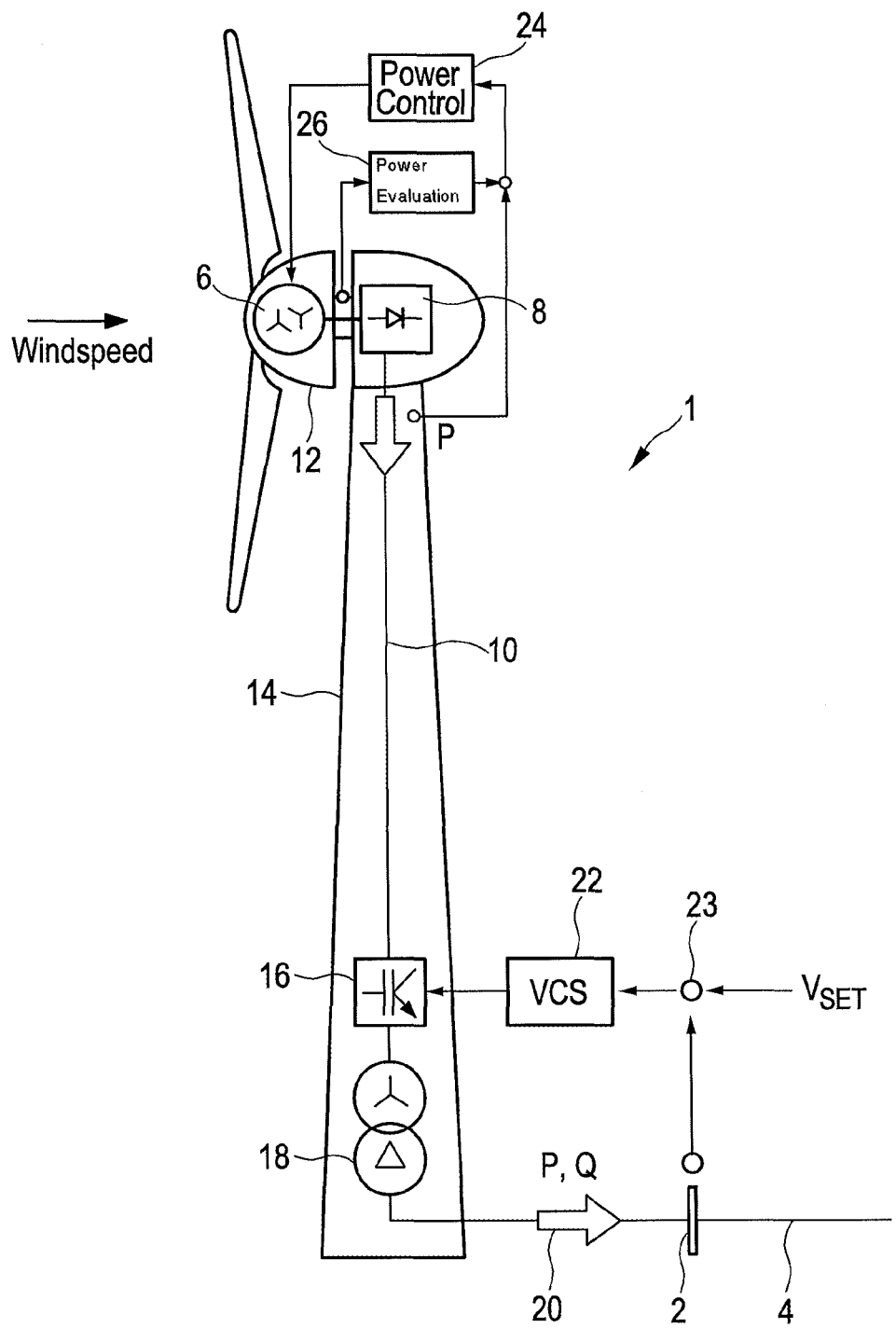
FIG. 2 shows a schematic view of a wind power installation that is connected to a grid, based on a voltage control system (VCS).

FIG. 2 shows a schematic view of a wind power installation 1 connected to electrical supply grid 4 over grid connection point 2. Electrical supply grid 4 is simply referred to as grid 4 or network 4, whereby these terms are used synonymously.

Wind power installation 1 comprises generator 6, which is driven by the wind, thereby producing electric energy. One of the embodiments of generator 6 is an electrically excited multiphase synchronous generator 6 with 2 respectively star-shaped wired 3-phase systems, which is illustrated by means of the two star symbols in generator 6 of FIG. 2. The generated alternating current, namely the 6-phase alternating current in the mentioned example, is rectified by rectifier 8, and transmitted as direct current via respective DC current line 10, which can comprise several individual lines, from nacelle 12 down tower 14 to inverter 16. Inverter 16 produces alternating current from the direct current, namely in the example shown, a 3-phase alternating current to be fed into grid 4. For this, the alternating current generated by inverter 16 is stepped up by means of transformer 18 so as to be fed into grid 4 on grid connection point 2. Illustrated transformer 18 uses a star delta connection, namely and primarily a star connection and, secondarily, a delta connection, which is illustrated here merely as an example of one embodiment. The feeding into grid 4 can also include, besides the feeding in of active power P, the feeding in of reactive power Q, which is illustrated by arrow 20. For the concrete feed-in, inverter 16 is controlled by respective control unit 22, whereby control unit 22 can be structurally combined with inverter 16. FIG. 2 is to illustrate the basic construction, and the specific arrangement of the individual elements can be chosen differently than illustrated here. For example, transformer 18 can be provided outside tower 14.

In particular, control unit 22 controls inverter 16 such that the manner of the feed into the grid is controlled. Tasks are thereby performed, such as adjusting the power that is to be fed to the situation in grid 4, in particular the frequency, phase and amplitude of the voltage in the grid. In addition, control unit 22 is designed to control the portion of the active power P and reactive power Q of the power that is actually fed into grid 4. Here, measurements are performed in grid 4, in particular on grid connection point 2, and are evaluated accordingly. Among other things, the actual voltage in grid 4 is measured, in particular in the form of the actual effective value of the voltage, and compared with the default value for the voltage, namely default value $V_{SET}$.

Accordingly, the illustrated system, and in particular inverter 16 with control unit 22, form a voltage control system, which is abbreviated as VCS.

To control the generator of the wind power installation, power control block 24 and power evaluation block 26 are provided in the area of the nacelle. In the example of the illustrated embodiment, power control block 24 particularly controls the excitation, namely the excitation current of the separately excited synchronous generator. Power evaluation block 26 evaluates the power led to rectifier 8, and compares it with the output power released by rectifier 8 over DC current line 10 to inverter 16. The result of this evaluation is forwarded to power control block 24.

FIG. 2 also illustrates that the system shown should have a voltage control system for an intelligent feed-in so as to operate the wind power installation as stably as possible, in particular near a stability boundary.

Figure 3:
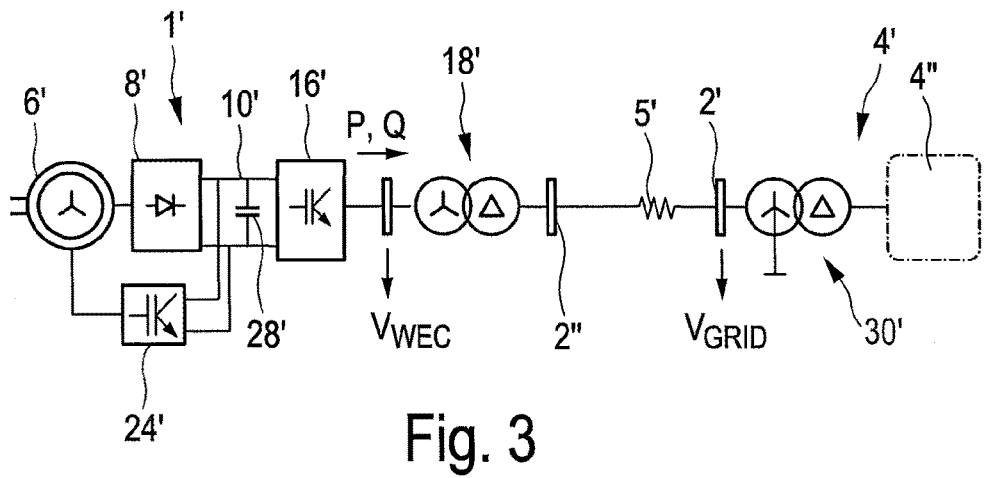
FIG. 3 shows a schematic view of a circuit arrangement of a voltage controlled feed-in of a wind power installation into an AC grid.

FIG. 3 illustrates the connection of wind power installation 1' to so-called "weak grid 4". A weak grid here refers to a grid with high impedance or an impedance above a particular threshold. This is illustrated in FIG. 3 by means of serial impedance 5'. In addition, said serial impedance 5' was provided in a test structure that corresponds to the structure in FIG. 3, and which was used to examine the behavior of wind power installation 1' on weak grid 4'.

The structure of FIG. 3 assumes generator 6', which is driven by the wind and provided as a synchronous generator. The generated electrical power of generator 6' is rectified in rectifier 8', and provided to inverter 16' on the input side on a DC link with intermediate circuit capacitor 28'. The structure shown compares DC line 10' with the DC link of inverter 16' on the input side to simplify the illustration. A DC line on the input side can indeed be electrically identical with an intermediate circuit, or a boost converter is provided on the input side, which is not explained in detail here. Rectifier 1' and inverter 16' can also be physically separated from each other, as already explained in FIG. 2 with regard to rectifier 8 and inverter 16.

Finally, exciter control 24' is provided, which can be fed with energy from the DC link that is represented by intermediate circuit capacitor 28'. Said exciter control 24' controls the excitation current of separately excited generator 6' and basically corresponds to power control block 24 of FIG. 2.

Inverter 16' can feed in active power P and/or reactive power Q. FIG. 3 states the voltage of inverter 16' on the output side as voltage of the wind power installation $V_{WEC}$. For the feed-in, this is stepped up by transformer 18, and then fed into grid 4' on grid connection point 2'. Here, grid 4' also comprises grid transformer 30'. The actual grid that starts after grid transformer 30' is specified with the reference sign 4″. The voltage on grid connection point 2′ is referred to as grid voltage $V_{Grid}$.

To illustrate the weak grid, serial impedance 5′ is shown in front of grid connection point 2′. Said serial impedance 5′ exists only in this test structure or illustrating structure, and indicates the grid impedance. Therefore, the point shown directly next to transformer 18′ can also be referred to as grid connection point 2″. This differentiation between these two grid connection points 2′ and 2″ only results from this use of serial impedance 5′, and usually does not exist in this form in real grids.

Figure 4:
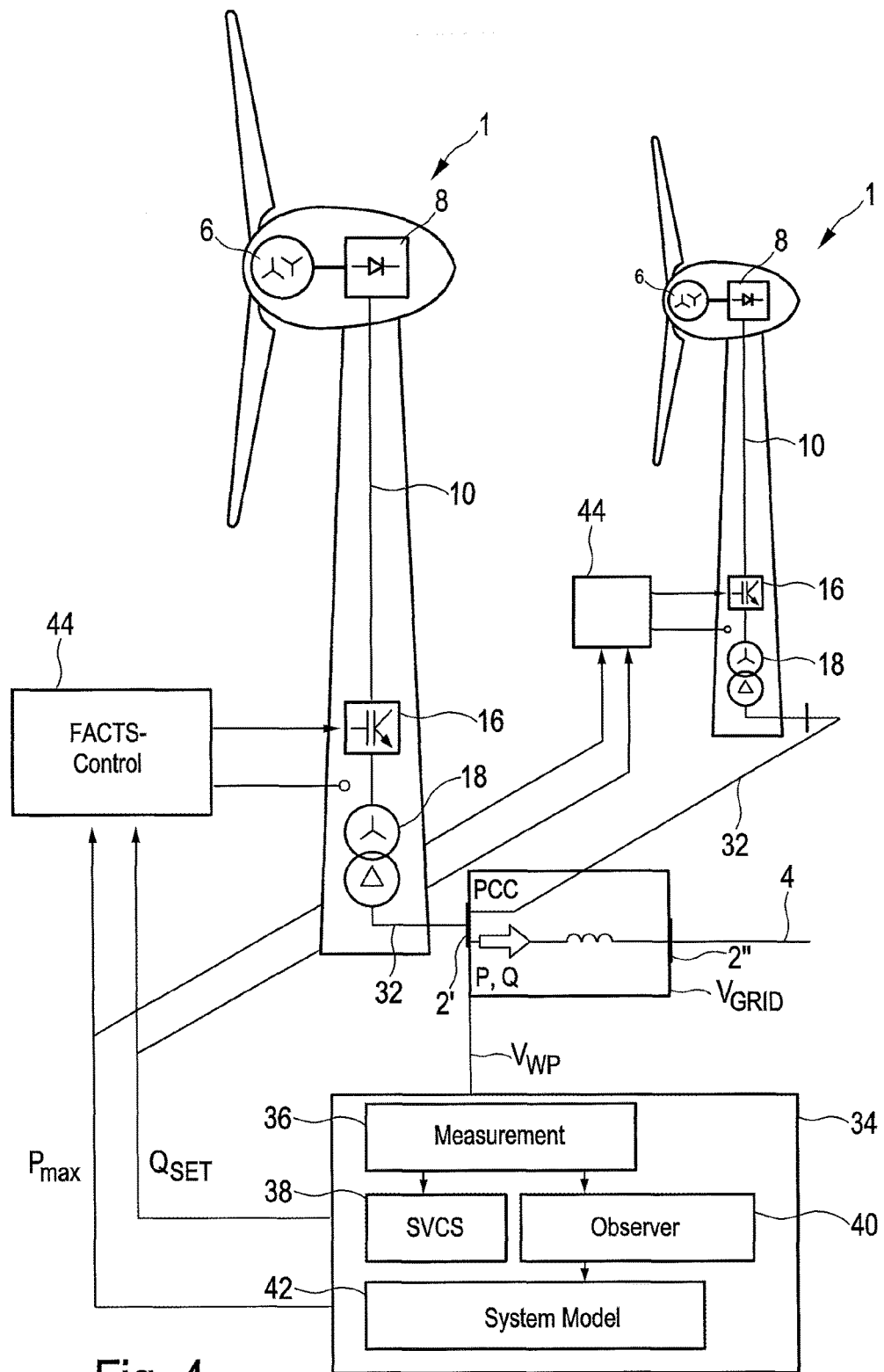
FIG. 4 shows a schematic view of two wind power installations connected to a grid over a joint grid connection point.

FIG. 4 shows another illustrative and schematic example, according to which two wind power installations 1 are connected to supply grid 4. Each wind power installation 1 is basically designed as explained in FIG. 2, namely with generator 6, rectifier 8 and DC line 10, which indeed comprises at least two individual lines, namely for positive and for negative current, which also applies to DC line 10 of FIG. 2. Furthermore, wind power installation 1 comprises inverter 16 and transformer 18. Access line 32 leads from each of the two wind power installations 1 to a or the grid connection point 2′ on the wind power installation side. Thus, these two wind power installations 1 shown as examples, which can be representative for a wind park with far more than wind power installations, feed their generated power jointly on this grid connection point 2′ on the wind power installation side. The fed-in power P and the fed-in reactive power Q, if present, is then led to connection point 2′ on the grid side, and fed into electrical supply grid 4.

The connection between grid connection point 2′ on the wind power installation side and connection point 2″ on the grid side cannot be ignored, and accordingly, the voltage $V_{WP}$ is reached on the wind power installation side on grid connection point 2′ on the wind power installation side, whereas the voltage $V_{Grid}$ is reached on connection point 2″ on the grid side.

The voltage $V_{WP}$ on the wind power installation side is determined and evaluated in evaluation block 34 for control. The evaluation is at first performed in such a way that the measured values are recorded with measuring block 36. The measurement results are forwarded, amongst other things, to stability control block 38, which can also be referred to as SVCS (Stability Voltage Control System) block. Stability control block 38 calculates a default value $Q_{Set}$ for the reactive power that is to be provided. This reactive power that is to be reached is then transferred as respective default value to both wind power installations 1, and accordingly would be transferred to all wind power installations in one amount. This default value can be transferred as an absolute value, in particular if wind power installations 1 have the same size and are subject to the same wind conditions. However, it can also be provided as a default value, such as a percentage value which refers to properties of the respective wind power installation, e.g., as the nominal capacity of the relevant wind power installation.

Further, measuring block 36 transmits the values to observer block 40, which calculates further conditions on the basis of the determined measurement values, such as the fed-in active power or the fed-in reactive power, and transmits its results to system model block 42. Observer block 40 can also obtain or derive information on the power demand, if necessary.

The system model of system model block 42 is used to determine a maximum active power $P_{max}$ that is to be fed in, and to feed it to wind power installations 1. This maximum active power that is to be fed in can be provided as an absolute or relative value. It is noted that the illustration of evaluation block 34 is to explain the structure. In general, it is not necessary that evaluation block 34 be physically designed as an independent device.

The preset reactive power $Q_{set}$ and the maximum active power $P_{max}$ are then transferred to the FACTS control block 44 of each wind power installation 1. The term "FACTS" is also used in the German language and is an abbreviation for "Flexible AC Transmission System". The FACTS control block 44 then implements the default values and controls inverter 16 accordingly, whereby it can also consider measurement values from the wind power installation conditions.

In particular, but not exclusively, evaluation block 34 can provide stability relevant defaults for a stable feed into grid 4. In particular, an operating point can be set that is favorable with regard to the amount of energy to be fed or with regard to the amount of power and stability. In particular, an operating point with a stability reserve can be determined here. Here, stability control block 38 can reach a stability reserve with regard to reactive power that is to be fed-in by means of a respective default of the reactive power $Q_{set}$.

Figure 5:
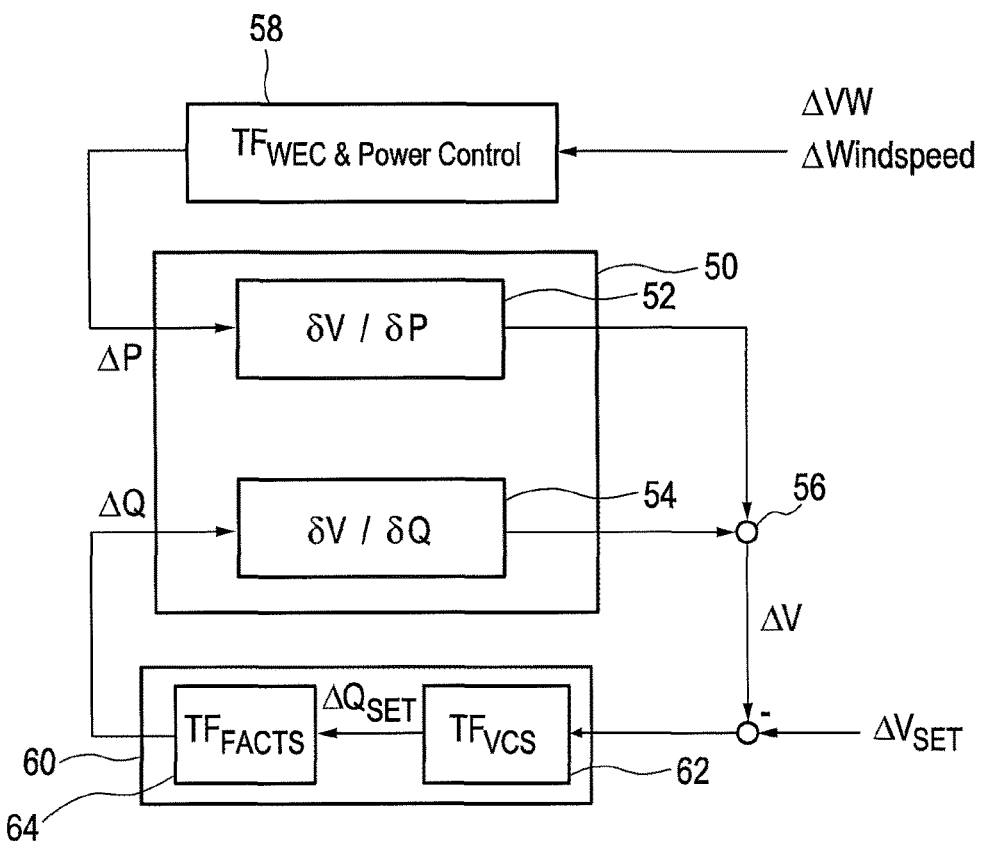
FIG. 5 illustrates parameters that can influence the sensitivity of a wind power installation connected to a grid.

FIG. 5 illustrates the sensitivity of a wind power installation connected to a grid and the corresponding influencing factors. Grid block 50 of FIG. 5 is specified representatively for the grid behavior, namely on the grid connection point. Grid block 50 illustrates that the grid can react to influences due to a change in voltage. All influences are illustrated here as changes of the active power ΔP and changes of the reactive power ΔQ. Active power block 52 considers influences of power changes, and reactive power block 54 considers influences of changes in reactive power. Active power block 52 shows a partial discharge of the voltage on the basis of the active power, and accordingly, reactive power block 54 shows a partial discharge of the voltage on the basis of the reactive power. This is a possibility to consider the respective dynamics of the grid behavior, i.e., the grid sensitivity, namely reactions to changes in the active power and the reactive power, by means of respective partial discharges, the results of which are added in summing block 56. Grid block 50 together with summing block 56 thus consider a dependency of the grid voltage on the grid connection point on two variables, namely the active power and the reactive power. The dependency is here considered by the partial discharges.

Changes in the active power result in particular from changes in the wind velocity ΔVW, which impacts wind power installation block 58. This wind power installation block 58 illustrates the influence of the change in wind velocity ΔVW upon the change in active power ΔP, whereby the control of the wind power installation is also to be considered, and is considered by this block 58.

The change in reactive power ΔQ can also depend on the wind power installation, or at least the control of the wind power Installation; however, it generally depends on other contexts that are independent of the wind velocity. Its change is illustrated by control block 60. For explanatory purposes, this control block 60 is divided into reactive power default block 62 and FACTS block 64. Control block 60, and thus reactive power default block 62, are initially dependent on a voltage deviation ΔV, namely on the grid connection point, less a predetermined voltage deviation $ΔV_{SET}$. On the basis of this resulting voltage deviation, reactive power default block 62 determines a reactive power that is to be fed in or, depending on a voltage change, a predetermined change of the reactive power to be fed in. This is forwarded to FACTS block 64, which accordingly implements the feed-in of the reactive power or the change in the feed-in of the reactive power.

Wind power installation block 58 and control block 60 can also be understood as a transfer function of the respective input value, and reactive power default block 62 and FACTS block 64 can each be understood as individual transfer functions that are interlinked in control block 60

Figure 6:
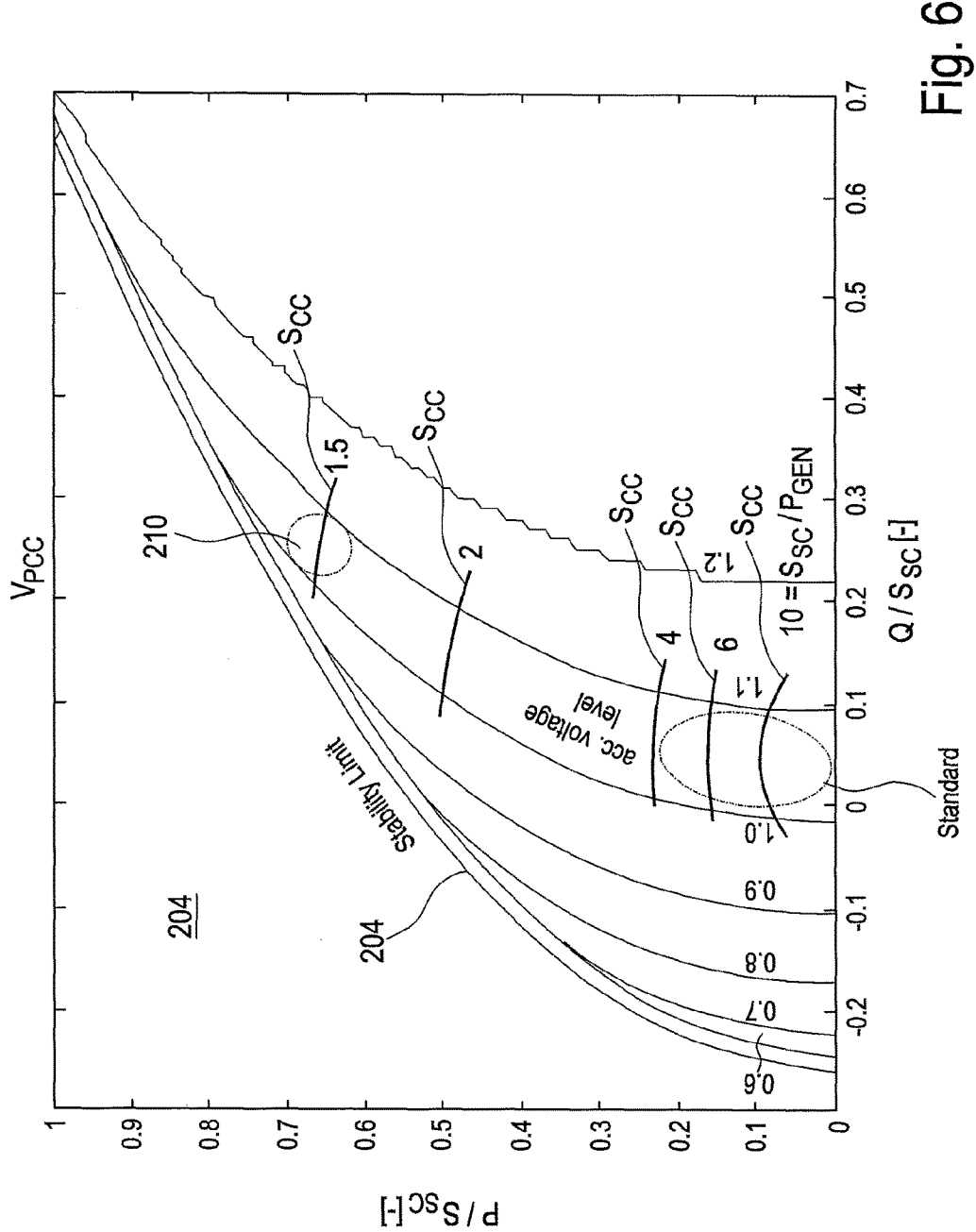
FIG. 6 shows a diagram analyzing the grid behavior on the grid connection point as voltage courses depending on the fed-in reactive power and fed-in active power.

FIG. 6 shows a dependency of the voltage for one embodiment on the grid connection point on the basis of fed-in reactive power Q and fed-in active power P. Reactive power Q is standardized to the short circuit power $S_{SC}$ of the grid on the examined grid connection point, and plotted on the abscissa. Power P is also standardized to short circuit power $S_{SC}$ of the same grid connection point, and established on the ordinate. Voltage $V_{PCC}$ is the voltage on the grid connection point standardized to nominal voltage $V_N$. This standardized voltage on the grid connection point is plotted as a graph for different values respectively and depending upon standardized reactive power Q and standardized active power P. Accordingly, the graph or the characteristic with the value 1 is the characteristic representing the reactive power and active power values required to achieve nominal voltage.

For example, nominal voltage is achieved if 10% of reactive power Q and 50% of active power P is fed in with regard to short circuit power $S_{SC}$.

The graph of FIG. 6 shows characteristics of a grid connection point of a grid with high impedance, at least with regard to this grid connection point.

Usually, for the illustrated grid connection point of the grid example, a feed-in would be realized within a standard operating range 200. The feed-in would thus be realized with an active power P of approx. 10% of short circuit power $S_{SC}$, with a feed-in of approx. 5% of the reactive power of short circuit power $S_{SC}$. Under the idealized assumption that fed-in active power P corresponds to the rated power or connected load of the generator or the sum of the generators connected to the grid connection point, the feed-in of 10% of short circuit power $S_{SC}$ would mean that connected load $P_{Gen}$ is 10% of the short circuit power $S_{SC}$. Short circuit current ratio $Scr=S_{SC}/P_{Gen}$ is therefore approx. 10. This corresponds to approx. the center of the illustrated standard operating range 200. FIG. 6 shows further short circuit current ratios Scr as short dashes for orientation, namely for the values for Scr of 10; 6; 4; 2 and 1.5.

According to one or more embodiments of the invention, however, it is proposed to feed in significantly more active power P, namely within the range of 60% to 70% of short circuit power $S_{SC}$. Accordingly, a feed-in of 20% to 30% of reactive power Q related to short circuit power $S_{SC}$ is to be provided in order for this to maintain the voltage on the grid connection point within the range of 100% to 110% of the nominal voltage. As a precautionary measure, it is pointed out that the feed-in of 110% of the nominal voltage on the grid connection point does not mean that an increased voltage of 110% can be measured on the consumer side. Firstly, there is usually a considerable grid section between the grid connection point and the first relevant consumer. Secondly, step transformers can be provided in the grid, which can provide a balance to a certain extent. The measures to be taken thereon, which depend on the individual grid, including consumer and generator and various other framework conditions, cannot be addressed in this application. An expert is usually familiar with the required measures.

This proposed section is shown in FIG. 6 as increased operating range 210. This increased operating range has a short circuit current ratio Scr of approx. 1.5. No noteworthy generator has been connected to the grid so far with such short circuit current ratio.

The illustration of FIG. 6 is the result of a grid analysis of the underlying grid with regard to the relevant grid connection point. For this purpose, as explained above, the relevant elements in the grid were analyzed and determined respectively by solving the Jacobian matrix. This results in the present illustration of FIG. 6, according to which, in simple terms, the characteristics to the right side, i.e., with higher fed-in reactive power Q, also reflect increased voltages on the grid connection point. With decreasing reactive power Q, i.e., to the left side, the voltage on the grid connection point decreases. However, reactive power Q cannot decrease arbitrarily, and with too low (already negative) a reactive power Q, the Jacobian matrix becomes singular, according to the associated active power P, i.e., impossible to solve in mathematical terms. A singular Jacobian matrix means that there is an instable condition. This results in stability boundary 202, which is accordingly shown on the left-hand side of the illustration in FIG. 6. The area to the left of stability boundary 202 which has a higher active power P and/or a lower reactive power Q, respectively, is instable area 204. As a purely precautionary measure, it is pointed out that stability boundary 202 does not coincide with a single characteristic of a voltage value on the grid connection point, but rather seems to cut the plurality of characteristics. However, a plurality of characteristics cannot be cut, as there are no values, and thus no plurality of characteristics, beyond stability boundary 202.

The preferably operating range, namely increased operating range 210, has a smaller distance to stability boundary 202 than standard operating range 200. However, it should be noted that no specific considerations or analyses were made with regard to the grid characteristics, as shown in FIG. 6. In particular, the distance to a stability boundary, as it is shown in FIG. 6 as stability boundary 202, was not known, at least not in the quality and quantity shown in FIG. 6. Rather, the installation of large power plants is oriented to the criterion of the short circuit current ratio, and this is as large as possible, preferably over (or even significantly over) 10. Small generators, such as wind power installations, have so far usually been connected to strong grids that were easily able to cope with the connection of another wind power installation. As a result, the connection was made, be it intentionally or not, with high short circuit current ratio $S_{SC}$.

The proposed solution accurately analyzes the grid with regard to the provided grid connection point, in particular by quantitatively incorporating contexts as shown in FIG. 6—and preferably in FIGS. 7 and 8, which will be explained below. In particular, such an analysis is performed by a repeated formation and solution of the Jacobian matrix for diverse points. Based on such a grid analysis, a stability boundary according to stability boundary 202 can be determined, and a desired operating range according to increased operating range 210 in FIG. 6 can be chosen.

In addition, it is proposed that the wind power Installation be controlled in the meaning of a closed control loop, as is shown in particular in FIG. 2 and FIG. 4. In FIG. 2, the control loop basically comprises inverter 16, transformer 18 and control unit 22, considers measurement values on grid connection point 2 and controls inverter 16 so as to achieve the fed-in active power P and the reactive power Q according to arrow 20. The control can also impact the control of the wind power installation in the area of generator 6; however, the described control loop comprising inverter 16, transformer 18 and control unit 22 does not require mechanical elements and is able to react very quickly. For this, the knowledge of the grid characteristics on the grid connection point, i.e., grid connection point 2 according to FIG. 2, can also be considered, in particular in control unit 22. Thus, a quick control can be implemented which recognizes the grid behavior on the grid connection point, particularly the stability boundary. This makes it possible to operate the wind power installation or the wind park—and other generators, if applicable—within a desired operating range, such as the increased operating range 210 of FIG. 6, and at the same time to ensure high stability and safety.

Figure 7:
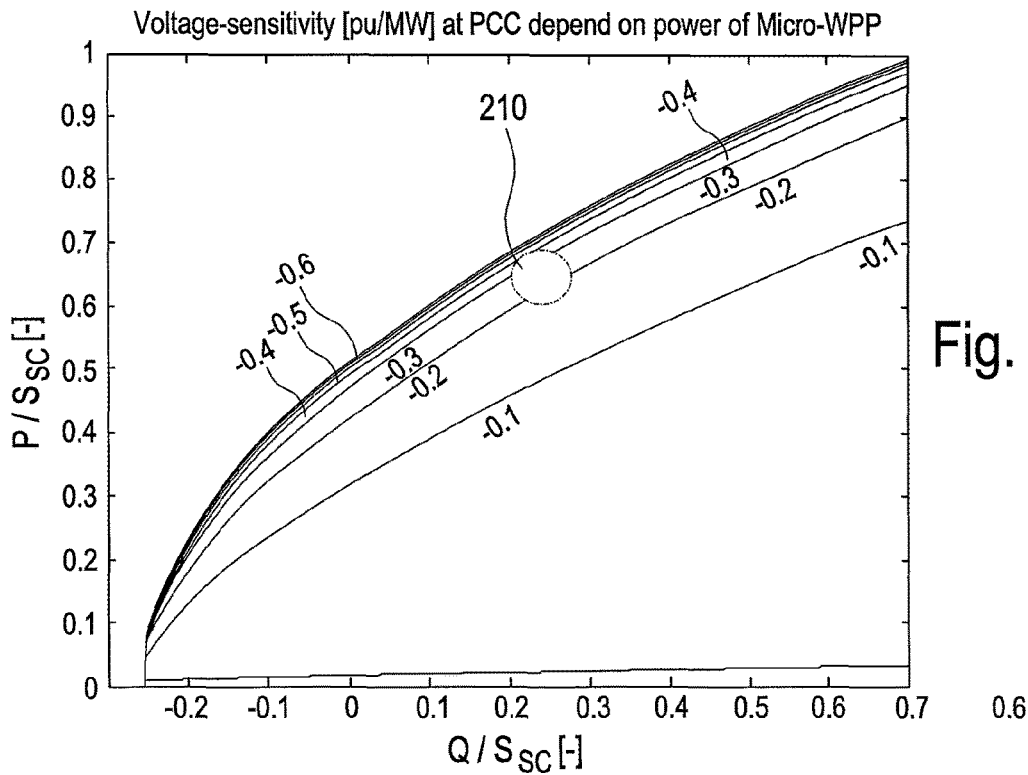
FIG. 7 shows a sensitivity as a voltage change caused by changes of the active power depending on the fed-in and standardized reactive power and active power.
Figure 8:
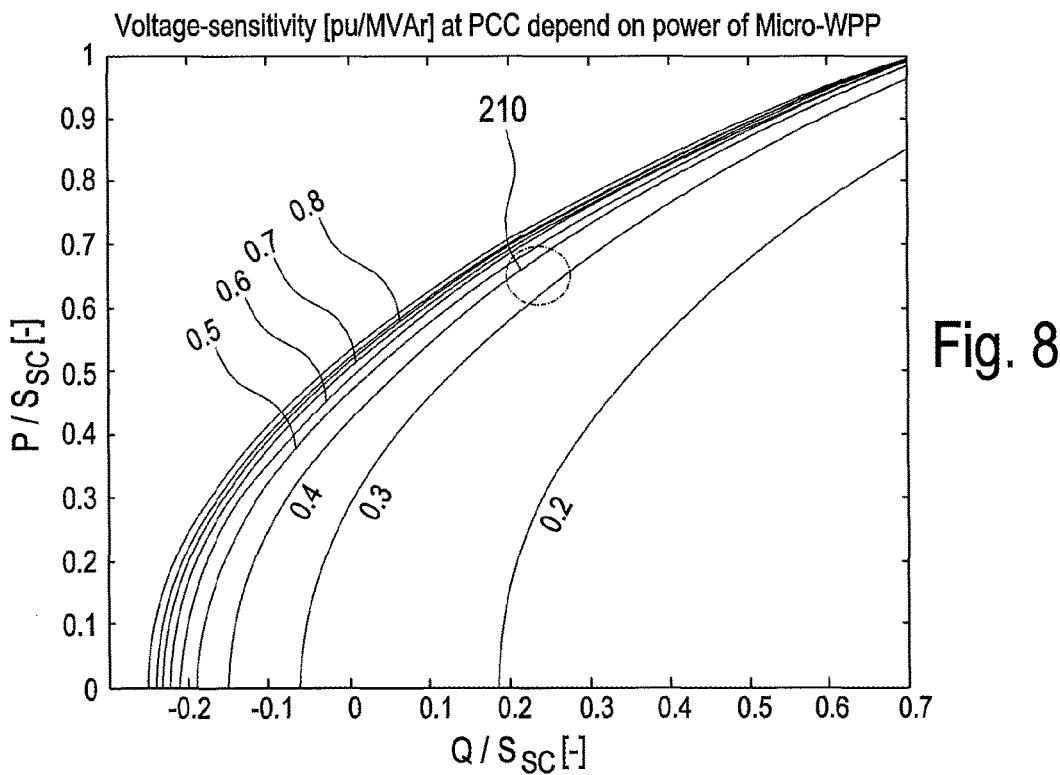
FIG. 8 shows a sensitivity as a voltage change caused by a change of the reactive power depending on the standardized reactive power and active power.
Figure 9:
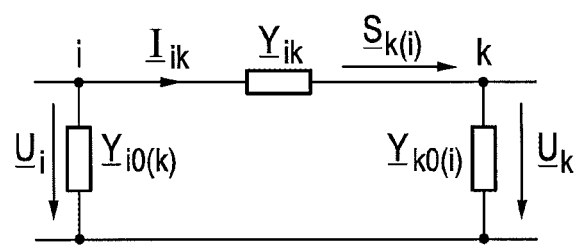
FIG. 9 shows a generalizing grid illustration.

FIGS. 7 and 8 show the voltage sensitivity depending on reactive power Q and active power P. FIGS. 7 and 8 thus use the same values on the abscissa and the ordinate, namely standardized reactive power on the abscissa and standardized active power on the ordinate.

The voltage sensitivity shown is the change in voltage with the change in active power pursuant to FIG. 7 or the change in voltage with the reactive power pursuant to FIG. 8. In other words, the partial derivation of the voltage on the grid connection point according to the active power in FIG. 7 and the partial discharge of the voltage according to the reactive power in FIG. 8 are illustrated. FIG. 7 thus shows the behavior of active power block 52 of FIG. 5. FIG. 8 shows the behavior of reactive power block 54 of FIG. 5, whereby in both cases, the illustration is shown depending on the operating points, which are determined by the currently fed-in reactive power Q and the fed-in active power P. The values of the respective characteristics relate to a grid connection point with a short circuit power $S_{SC}$=3.73 MVA, to which two wind power installations with a rated power of 2 MW each are to be connected as an example. Thus, this test arrangement allows the performance of tests with a short circuit current ratio of a little less than 1. However, for the tests performed, the respective actual power of the test wind farm was used as a basis, and determined as a connected load of the target wind farm, i.e., the (fictitious) wind farm that is to be examined.

With regard to the present embodiment, i.e., the exemplary configuration, the change in the standardized voltage related to a change in power P in MW or a change in reactive power Q in MVAr is described. FIGS. 7 and 8 also illustrate the desired, i.e., the increased operating range 210. Therefore, the voltage sensitivity with regard to changes in active power according to FIG. 7 is approx. −0.2 to −0.4. The voltage sensitivity in increased operating range 210 with regard to changes in the reactive power according to FIG. 8 is approx. 0.3 to 0.5. It is therefore proposed that, when designing the wind power installation, it be connected to the concrete grid connection point, to incorporate and consider this voltage sensitivity in the control with regard to changes in the active power, as shown in the example in FIG. 7 and/or with regard to changes in the reactive power, as shown in the example in FIG. 8. In particular, these values are to be considered in the control as well, and preferably also in the design of the control. Preferably, a controller amplification is chosen depending on the sensitivity, in particular the voltage sensitivity.

In particular, it is proposed to consider these values in the closed loop, as schematically realized by the elements shown in FIG. 2, i.e., inverter 16, transformer 18 and control unit 22. Here, transformer 18 is less important; however, it must frequently be present and required to feed in a respectively high voltage already on grid connection point 2. In particular, findings concerning the voltage sensitivity in control unit 22 are considered. This way, knowing these values, it is possible to design and implement a customized control for the concrete grid connection point. This makes it possible to reduce the previously high values of the short circuit current ratio of 10 and even higher, and to provide low values, such as 1.5 for the short circuit current ratio, and thus operate the wind power installation in the increased operating range 210, which is shown in FIGS. 6 to 8.

One or more embodiments of the invention thus proposes in particular that a wind power installation, and finally also a wind park, no longer be connected according to the old principle of the grid parallel operation, assuming that the grid capacity is sufficient, but rather that the connection point be specifically analyzed and that the results already be considered prior to the operation, and that a customized wind power installation or wind power installation park then be connected there. Preferably, the control and the operating range that is to be chosen, in particular with regard to the reactive power Q and the active power P to be fed in, are customized and arranged closer to a stability boundary than was previously done by experts. In so doing, the benefits of a wind power installation are used in a targeted manner, namely to respond rapidly and in a targeted manner to changes, in particular changes in grid conditions. This is to avoid an excessively large size of the grid, in particular of the specific grid connection point, at least for the connection of wind power installations to the grid. Nevertheless, it is possible to maintain and even improve stability if the control or regulator recognizes the characteristics of the grid connection point or the grid very well with regard to the grid connection point, and if it observes grid conditions.

As a purely precautionary measure, it is pointed out that a regulator is basically understood as a closed loop with feedback, whereby a control basically refers to an open "loop", i.e., a situation without feedback. Nevertheless, a control block that implements a control method, can be used in a control loop. With regard to the example in FIG. 2, this means that control unit 22 is a control to the extent that it comprises a certain control function or transfer function that it can also be non-linear and/or volatile, and/or relate to several sizes. However, this control unit is used in the loop shown in FIG. 2, which basically comprises, besides control unit 22, inverter 16, transformer 18 and finally a measuring unit on grid connection point 2 with a unit of comparison 23. Control unit 22 controls the inverter and is therefore integrated in the closed loop, making it part of a feedback control.

Figure 10:
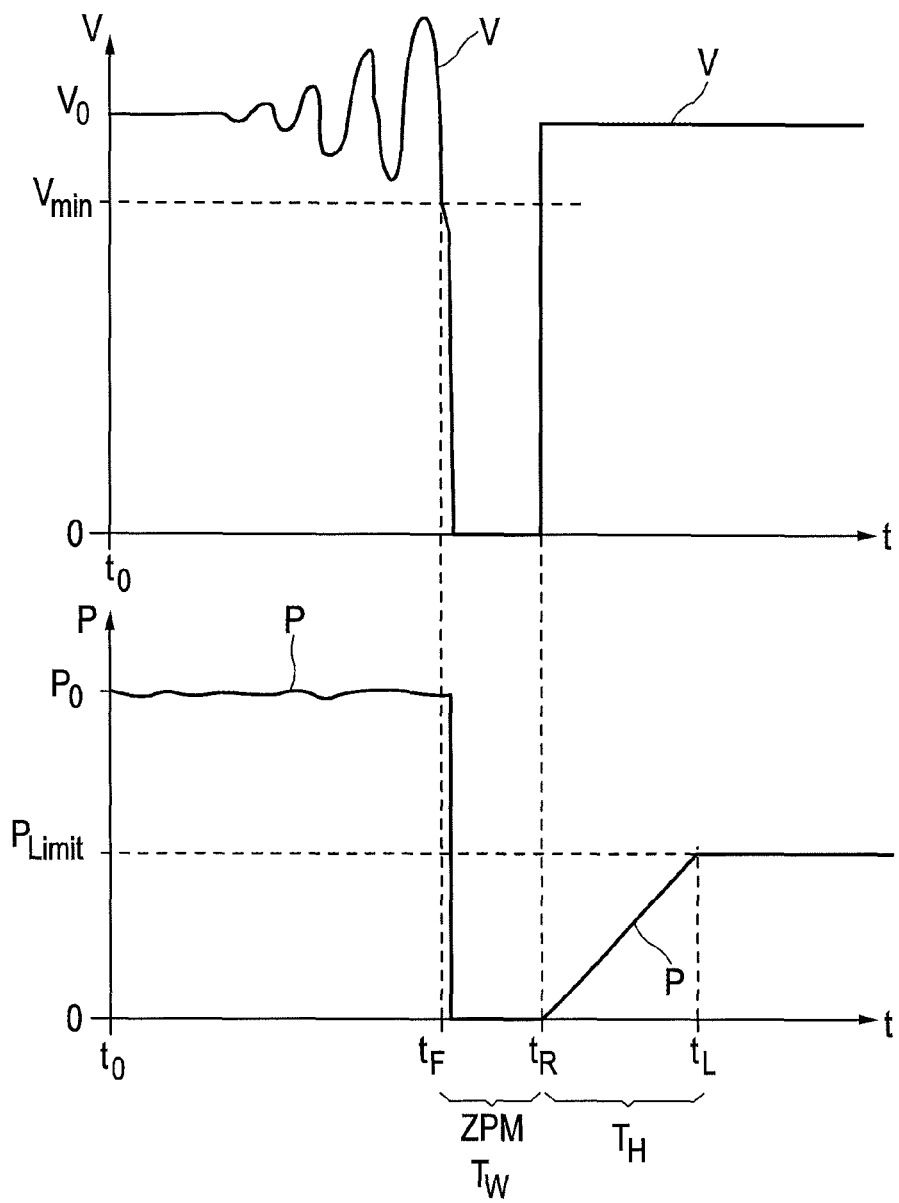
FIG. 10 shows a diagram illustrating a loss of stability with a resumption of the feeding in a changed operating point.

FIG. 10 shows in an upper diagram a schematic view of a voltage course on a feed point in relation to the time. The lower diagram correspondingly shows the course of active power P fed at the same time. According to this, a voltage V with the value $V_0$ exists at the point of time $t_0$. Said voltage $V_0$ is a normal voltage, and can, for example, be the nominal voltage at the corresponding place. At the same time, a power P is fed, which comes very close to the desired value $P_0$, which can be, for example, the nominal capacity of the respective wind power installation, particularly if sufficient wind is available. The fed power P can be subject to very limited fluctuations, which is not important here. Basically, the underlying wind power installation—a wind park can also be considered—is operated in an operating point, where said active power P with a value that comes close to $P_0$ is fed in.

If there are stability problems, the voltage V can, for example, start to fluctuate and become instable. FIG. 10 shows in this regard, in the upper diagram, an oscillation of the voltage as an example until the voltage V finally falls short of a threshold value $V_{min}$. This falling short can, for example, also occur without prior oscillation. At any rate, the voltage V falls below said voltage threshold value $V_{min}$ at the point of time $t_F$. The feeding is then interrupted, and the voltage V falls to the value 0. At the same time, the fed-in power P falls to 0.

Now the attempt is made to resume the feeding as quickly as possible. In this sense, the feeding is resumed at the point of time $t_R$ and the fed-in active power P is increased as soon and quickly as possible. Accordingly, the voltage V also increases again at the point of time $t_R$. Ideally, as a result of the feeding in of the first active power P, the voltage V jumps to the nominal value $V_0$. Said shown ideal course can, however, also be different.

To resume the feeding in of active power P as quickly as possible, the wind power installation remains connected to the grid, if possible, also directly after the occurrence of the fault at the point of time $t_F$, so that in the time from $t_F$ to $t_R$, no power P is fed in, but the plant remains connected to the grid. Such a condition is here referred to as zero power mode (ZPM).

Thus, it is possible to resume the feeding as quickly as possible, and to increase the fed-in active power P. However, it is now proposed to increase said fed-in active power P only to a smaller limited active power $P_{Limit}$. In this respect, the wind power installation is then operated in a limited operating point at the point of time $t_L$. Said limited operating point is here shown particularly by a reduced fed-in active power P. The wind power installation therefore takes a changed, stabilized operating point, which particularly has a higher stability distance, which is also referred to as a stability reserve, to a stability boundary. The wind power installation can thus already contribute to a grid support again, which is done at the price of a reduced fed-in active power P.

The operating point, which is here basically achieved at the point of time $t_L$, differs from the operating point, in which the wind power installation was operated prior to the point of time $t_F$, by a changed active power. The operating points can, however, also additionally or instead differ according to other parameters, particularly according to the fed-in reactive power.

The period from point of time $t_F$ of the loss of stability to the resumption of the feeding at the point of time $t_R$ is referred to as resumption time $T_W$. Hence, $T_W=t_R-t_F$. The period from the resumption at the point of time $t_R$ until the limited power value is reached at the point of time $t_L$ is referred to run-up time $T_H$. Therefore, $T_H=t_L-t_R$.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling an electric generator that is coupled to an electrical supply grid at a grid connection point, the method comprising:
    feeding electrical power into the supply grid when the generator is operating at a first operating point;
    monitoring the supply grid or the feeding of electrical power into the supply grid for a fault;
    interrupting the feeding so that no power is fed into the supply grid when the fault is identified; and
    resuming feeding so that electrical power is again fed into the supply grid, wherein resuming the feeding occurs at a second operating point or the feeding is gradually increased to the second operating point, and wherein the feeding into the supply grid at the second operating point takes place with a higher stability reserve than the first operating point, resuming the feeding includes:
        feeding less of at least one of active power and reactive power into the supply grid at the second operating point than at the first operating point, wherein the feeding less of the at least one of the active power and the reactive power includes at least one of: reducing the active power by at least 10%, and reducing the reactive power by at least 10%.

2. The method according to claim 1 wherein the generator is at least one of a decentralized generator, a wind power installation, and a wind park comprising several wind power installations, and the generator uses a voltage-based feeding to feed in the electric power.

3. The method according to claim 1 wherein resuming the feeding comprises:
    increasing the fed-in reactive power more quickly than the fed-in active power, so that a reactive power value at the second operating point is achieved earlier than an active power value at the second operating point.

4. The method according to claim 1 wherein the reactive power is adjusted to a value of the first or second operating point so as to support the grid, and then the active power is adjusted.

5. The method according to claim 1 wherein when resuming the feeding, the fed-in active power is increased with a predetermined course and the fed-in reactive power stabilizes the voltage, whereby the reactive power is based on a previously recorded grid characteristic of the electrical supply grid.

6. The method according to claim 1 wherein resuming the feeding occurs after a period of time.

7. The method according to claim 6 wherein the period of time is less than 10 seconds, and wherein resuming the feeding comprises a run-time in which a gradual increase to the second operating point occurs until the second operating point is reached.

8. The method according to claim 1 wherein the stability reserve is at least one of:
    a smallest difference between the fed-in reactive power and the reactive power of stability boundary,
    a smallest difference between the fed-in active power and the active power of stability boundary, or
    a smallest difference between a voltage on the grid connection point and a voltage of stability boundary.

9. The method according to claim 8 wherein the stability reserve is based on at least one of:
    a function of the grid voltage at the grid connection point depending on at least one of the fed-in reactive power and fed-in active power, and
    a function of the fed-in active power depending on the fed-in reactive power, or vice versa, wherein the stability boundary is provided as a curved surface in a space formed by the grid voltage on grid connection point, the fed-in reactive power and the fed-in active power.

10. The method according to claim 1 wherein the fault in the energy supply grid or in feeding electrical power into the energy supply grid is at least one of the following:
   a loss of stability of the supply grid,
   a loss of stability feeding into supply grid,
   an overcurrent in the supply grid,
   an overcurrent at the grid connection point,
   a short circuit in the supply grid,
   a voltage fall in the supply grid,
   a voltage fall at the grid connection point, and
   switching or stepping of transformers in the supply grid.

11. The method according to claim 10 wherein the fault is a loss of stability at the grid connection point, and wherein resuming the feeding includes at least one of the following:
   switching from a first control to a stabilization control, wherein the stabilization control controls the generator with higher stability in comparison to the first control, and
   the active power of generator that is to be fed in is limited to a value that is smaller than a nominal capacity of the generator.

12. The method according to claim 11 wherein when switching to the stabilization control, at least one of a limitation of the active power and a use of the central park control is maintained until it is identified that a loss of stability is no longer occurring.

13. The method according to claim 10 wherein the generator is a wind park that includes a plurality of wind power installations, wherein resuming the feeding includes switching from a first control to a central park control, wherein the central park coordinates and controls the wind power installations in the wind park so as to counteract a loss of stability.

14. The method according to claim 1, further comprising:
   resetting control of the generator to a first control by an external signal of a the stabilization control, and
   annulling a limitation of the fed-in active power after a threatening loss of stability has been identified on the grid connection point or after resuming the feeding.

15. The method according to claim 1 wherein a wind park with several wind power installations is provided, wherein each wind power installation is a generator entity, wherein after interrupting the feeding of one or several wind power installation(s), said resuming feeding comprises resuming feeding said wind power installations individually and switching from a first control to a stabilization control that controls the respective wind power installation with higher stability in comparison to the first control.

16. The method according to claim 1 wherein resuming the feeding continues to occur while the fault still exists wholly or partly.

17. The method according to claim 1 wherein the generator remains coupled to supply grid and remains operating when the feeding is interrupted.

18. The method according to claim 1 wherein the reactive power and the active power are increased respectively with a ramp function in terms of time, and wherein the ramp function causes a reactive power value at the second operating point to be achieved earlier than an active power value at the second operating point.

* * * * *